United States Patent Office 3,534,422
Patented Oct. 20, 1970

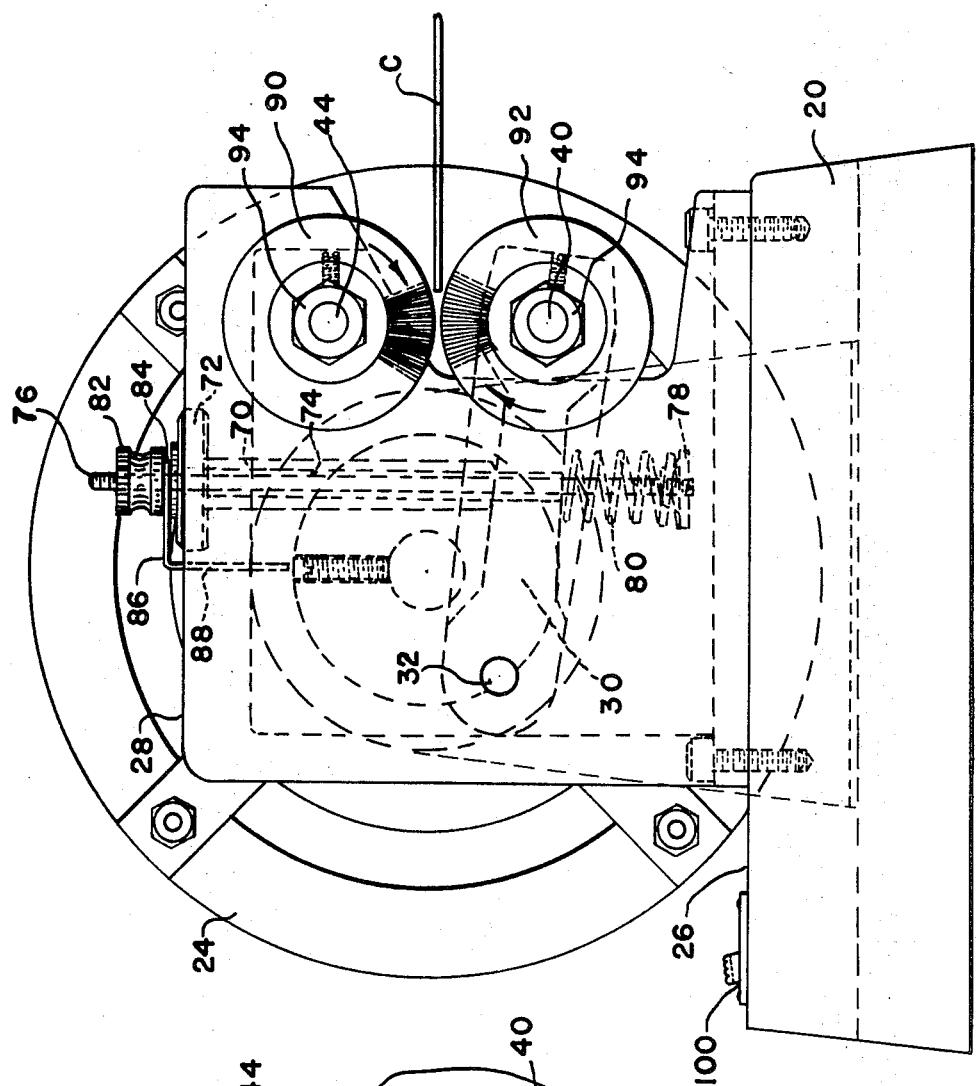
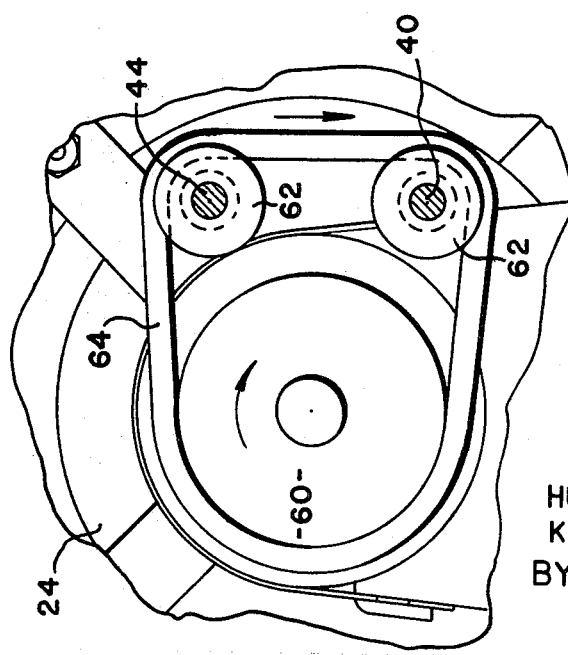
FIG. 1
FIG. 4
INVENTORS
HUBERT J. CARPENTER
KENNETH L. DUNN
BY
ATTORNEY

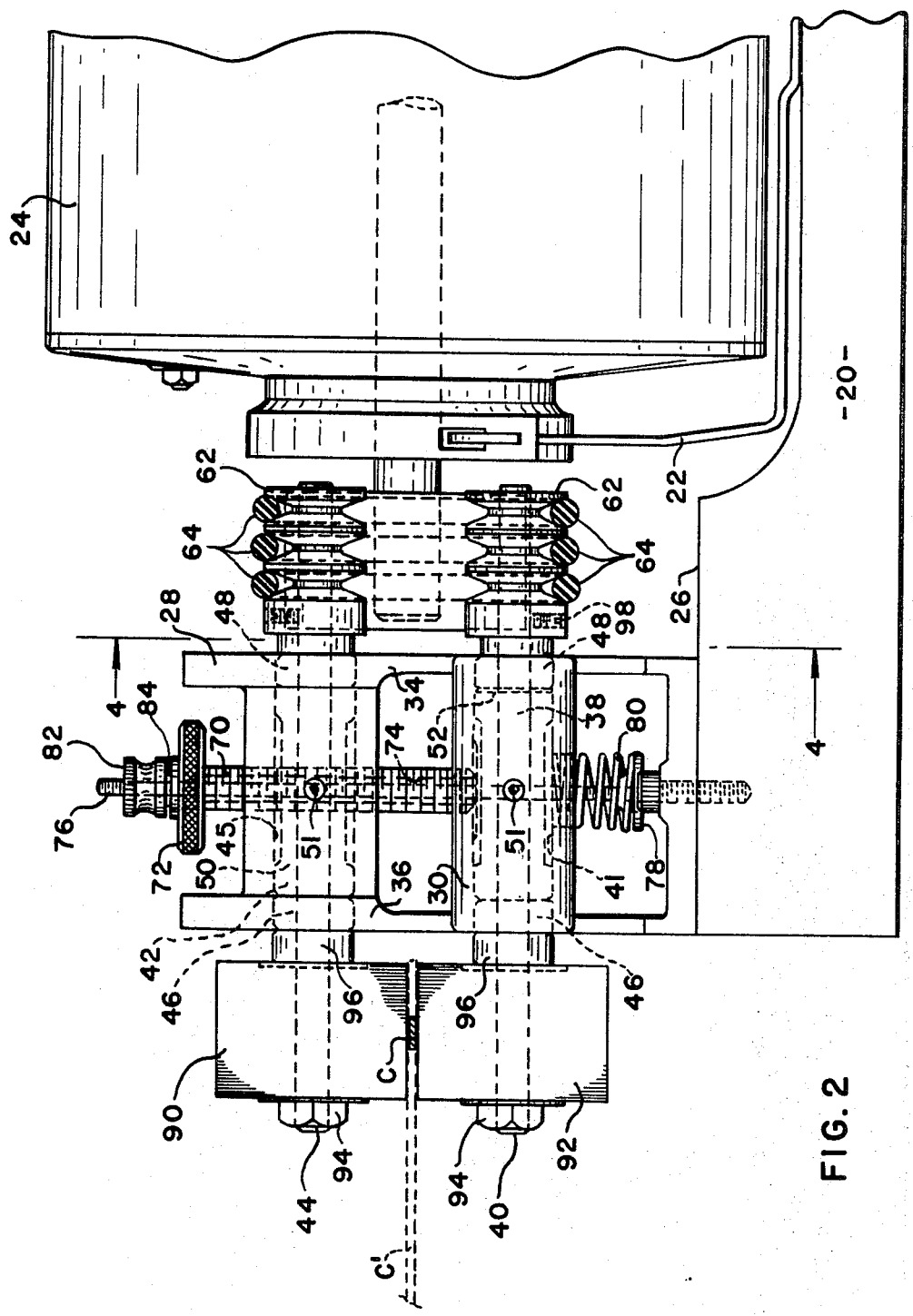

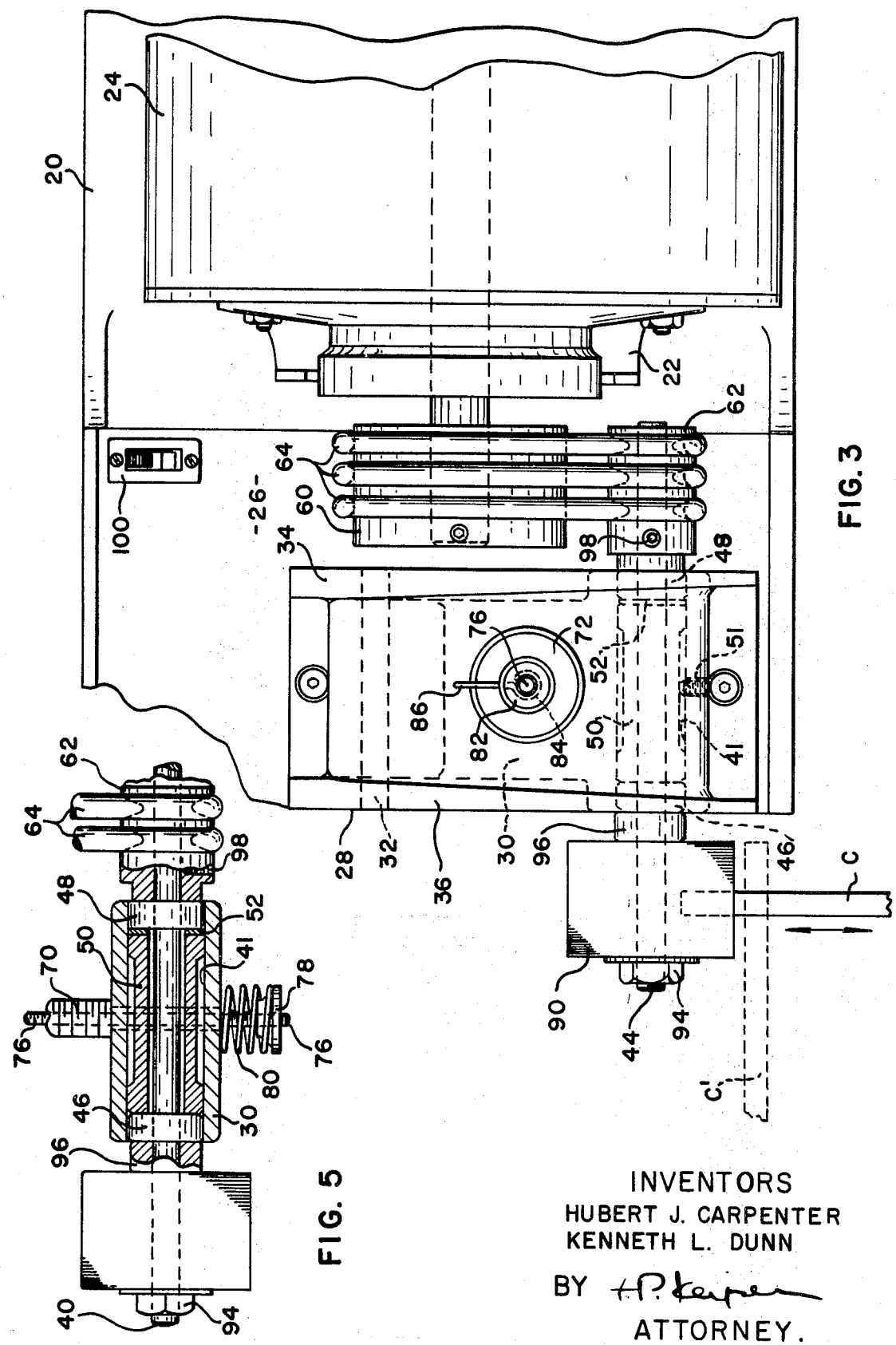

3,534,422
CONDUCTOR STRIPPER
Hubert J. Carpenter, Manlius, and Kenneth L. Dunn, Fayetteville, N.Y., assignors to Carpenter Manufacturing Co., Inc., Manlius, N.Y., a corporation of New York
Filed Nov. 1, 1968, Ser. No. 772,609
Int. Cl. A46b 13/02
U.S. Cl. 15—88          4 Claims

ABSTRACT OF THE DISCLOSURE

Insulated conductor stripping apparatus comprising side by side stripping wheel shafts and a reversible motor, for driving the shafts at like speeds in the same direction and a switch for reversing the motor drive to both shafts simultaneously, a pair of like stripping wheels which may be wire brush type having opposed cylindrical surfaces secured to each of the shafts and means for fixing the spacing between the wheels.

---

This invention relates to stripping insulation from insulated conductors.

In the stripping of insulation from relatively heavy conductors such as flat conductor bars, the use of a pair of rotary wire brushes or fiberglass wheels has been proposed, the wheels rotating in opposite directions, and being spaced to the approximate thickness or diameter of the conductor from which insulation is to be stripped. The friction of the wheels or cutting action is digging into the insulation of conductors as insulation removal is effected results in a tangential pull or tug on the conductor that makes it difficult if not impossible to manually control the cutting. It has been proposed to clamp the conductor in a jig in the feeding of the conductor into the abrading area between the wheels. Manually holding the conductor relative to the stripping apparatus or manually holding the stripping apparatus, if portable, in respect to the conductor to be stripped has generally required some extra support or grip to cope with the tugging force encountered.

The present invention is directed to stripping apparatus wherein the frictional or abrasive contact with the conductor being stripped is neutralized by rotating the stripping wheels in the same direction whereby the tangential forces created by one wheel on one side of the conductor is offset by the equal and opposite force of the other wheel on the other side of the conductor. By such means, the heaviest conductor is capable of being manually held, and the stripping apparatus, if portable can readily be held by the operator, without the apparatus being under the influence of the stripping forces. Thus, any tendency to strain the conductor, except in shear, while undergoing stripping is substantially eliminated. So long as both stripping wheels, whether of the wire bush type or fiberglass type, rotate in the same direction, forces are neutralized. Hence the direction of rotation of both wheels, while in the same direction, is unimportant. By providing a reversible source of power, the wheels may both rotate in one direction, or both rotate in the opposite direction. In abrading the insulation from a conductor the cutting edges of fiberglass, or the wires of wire brushes become rounded over, and the radial tips tend to be deflected by abrasive contact with the work, and such deflection tends to take a set, and reduce the cutting action. When this has occurred, rotation of both wheels is reversed, to immediately present fresh cutting edges to the work and reversal may be effected as often as desired to maintain abrasive efficiency.

The above and novel features of the invention will appear more fully hereinafter from the following detailed description when taken in conjunction with accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIG. 1 is an end view of the apparatus;
FIG. 2 is a side elevation of the apparatus;
FIG. 3 is a plan view;
FIG. 4 is a sectional view taken on the line 4—4 of FIG. 2; and
FIG. 5 is a sectional view through one of the bearing assemblies.

Referring to the drawings there is shown a base 20 having mounted thereon a motor bracket 22 and motor 24. On a step 26 of the base, there is affixed a hollow upper bearing support bracket 28, in which there is pivoted a lower bearing support arm 30, on the pivot pin 32 extending between the side walls 34 and 36 of the bracket 28. The free end of the arm is extended to the outside width of the bracket 28, and is provided with a bearing assembly 38 for the shaft 40 disposed in a bore 41. The bracket is also provided with a bearing assembly 42 for the upper shaft 44 disposed in a bore 45. Each of the bearing assemblies comprises a pair of spacing ball bearings, 46 and 48, with a spacer sleeve 50 bearing against the outer raceway of one of the bearings, 46, and against the outer raceway of the other through an annular spring washer 52. The spacer sleeves 50 of each bearing are secured in their respective bores by a set screw 51. The shafts 40 and 44 are held parallel and centered by the preloaded bearings.

The motor is provided with a pulley, which may be in the form of a cylindrical drum 60, and each of the shafts 40 and 44 are provided with multiple groove pulleys 62 of like diameter, and slightly resilient belts 64 of circular section are provided.

The bearing arm 30 is adjustable with reference to the bracket whereby to accurately space the shafts 40 and 44. For this purpose a heavy thub screw 70 having a knurled knob 72 is threaded in the upper bracket 28, and its lower end bears against the arm 30. The screw 70 has a central bore 74 through which extends a rod 76, such rod extending through a narrow slot in the arm 30. The lower end of the rod is provided with a compression spring seat 78, for a compression spring 80, which bears against the underside of the arm 30. The upper end of the rod 76 is provided with a knurled thumb nut 82 which bears, through the circular loop 84 of a wire key 86 against the knurled knob 72, the depending end 88 of the key extending downwardly through an aperture in the bracket 28.

Affixed to the ends of the shafts 40 and 44 are like cylindrical wire brushes 90 and 92. Such brushes are affixed to the shaft frictionally, or by keying, and by tightening the shaft end nuts 84, the bearing assemblies are loaded to the extent desired between the spacer collars 96 and the pulleys 62, which are affixed to their respective shafts 40 and 44 as by setscrews 98.

As will be seen in FIGS. 1 and 2, by suitably spacing the wire brush wheels by the thickness of the copper of the conductor C to be stripped, the conductor is readily inserted between the wheels, which are rotating in the same direction, and the insulation brushed away. Since the brushes are rotating in the same direction their tangential contacts with the conductor insulation counteract one another, making it possible for an operator to feed the conductor into the space between the wheels without being subjected to pull or push since the frictional contact of the brushes on the upper and lower sides counteract one another. With both wheels of like diameter and like peripheral velocities, the abrading effect completely offsets any tendency to move the conductor, when disposed between the wheels, so that the conductor can be held manually without danger of the conductor being wrested from the operator's grip.

If desired a belt of the timing type, with pulleys designated for receiving the belt, may be used to assure like drive speeds for both shafts 40–44, although plain belts appear to be satisfactory.

Since the tip ends of the wire of wire brushes deflect on contact, the sharp edges which best effect the abrasive action become worn away. It has been the practice to remove the brushes in strippers where the shafts rotate reversely, the brushes being reversed when replaced to provide fresh wire end cutting edges. In the present apparatus, the motor is made reversible, a reverse switch 100 being provided. By merely reversing the rotation of the motor, the necessity for removing the wire brush wheels is completely eliminated, and the loss of time heretofore required for removing the wheels and replacing them is eliminated.

Since the effect of the opposed tangential contact with the conductor insulation is to neutralize, through the conductor any tangential drag on the conductor, it is possible to manually insert a conductor between the wheels whether disposed transversely of the wheel axes as indicated at C or parallel with the wheel axes at $C^1$, or for that matter at any angle. When inserted, as indicated at $C^1$, see FIG. 3, a relatively sharp demarkation between stripped conductor, and unstripped conductor insulation is produced, whereas when introduced as is indicated at C, the insulation is feathered off along an arc of the radius of the wheels as the stripped area is approached.

In introducing an insulated conductor for stripping into space between the wheels, by moving the conductor tangentially toward the wheels, and contacting the wheel rotating into the space, the conductor is drawn in. Once between the wheels, there is practically no tendency to move the conductor, and the operator is free to move the conductor as desired to effect stripping of such areas as desired. It will be appreciated that contact with the other wheel rotating away from the abrading space will tend to move the conductor away from the abrading area.

While a single modification of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. An insulated conductor stripping apparatus comprising means for supporting side by side a pair of stripping wheel shafts, power means for driving said shafts at like speeds in the same direction, means for reversing the power drive to both shafts simultaneously, a pair of like stripping wheels having opposed cylindrical surfaces formed by the ends of radially extending filamentary elements having cutting edges substantially flush with their respective cylindrical surfaces and secured to each of said shafts respectively and means for at will fixing the spaced relation between the wheels whereby as the leading edges of the ends become dull, the trailing edges become sharpened for effective abrasion on reverse rotation.

2. Apparatus according to claim 1 wherein the wheels are wire brushes.

3. Apparatus according to claim 1 wherein the shafts rotate on axes parallel to one another.

4. Apparatus according to claim 1 wherein there is provided a base, and the power means comprises a reversible motor, and wherein one of the shafts is mounted for rotation on an axis fixed with respect to the base, and the other shaft is mounted for rotation on an axis which may be moved toward or away from the fixed axis shaft.

References Cited

UNITED STATES PATENTS

| 2,225,200 | 12/1940 | Ames | 15—88 X |
| 3,001,280 | 9/1961 | Lyon | 15—88 X |
| 3,385,140 | 5/1968 | Carpenter et al. | 51—80 X |

FOREIGN PATENTS

| 714,175 | 8/1954 | Great Britain. |

EDWARD L. ROBERTS, Primary Examiner

U.S. Cl. X.R.

15—21; 51—80